UNITED STATES PATENT OFFICE.

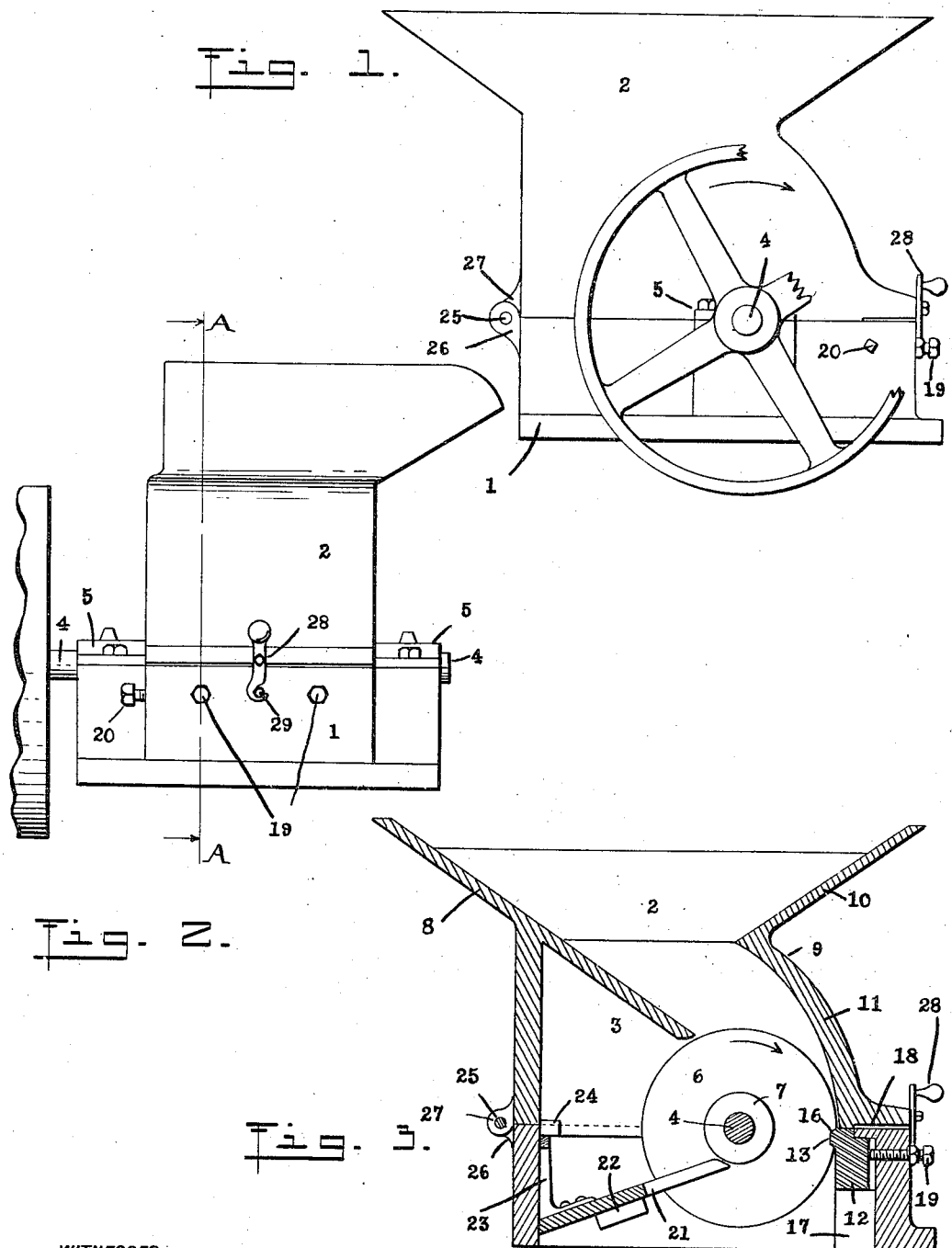

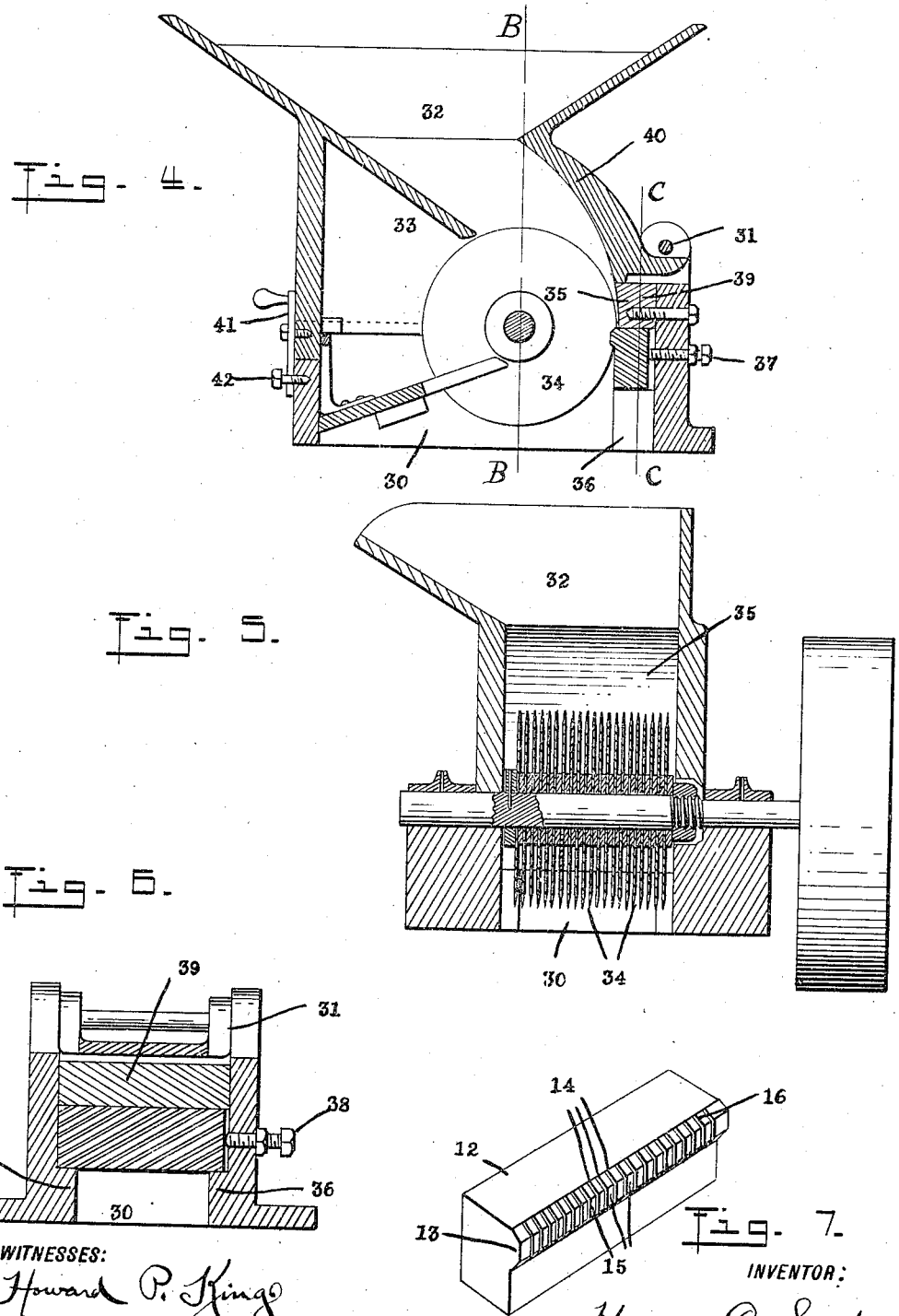

HENRY C. SANDER, OF NEWARK, NEW JERSEY.

MACHINE FOR SLICING MEAT, VEGETABLES, &c.

1,240,261.

Specification of Letters Patent. Patented Sept. 18, 1917.

Application filed July 24, 1914. Serial No. 852,787.

*To all whom it may concern:*

Be it known that I, HENRY C. SANDER, a citizen of the United States, and a resident of Newark, in the county of Essex and State of New Jersey, have invented certain Improvements in Machines for Slicing Meat, Vegetables, &c., of which the following is a specification.

This invention relates to that class of machines which are employed for slicing bacon, a whole side at a time; for cutting potatoes and the like into slices, which slices in the case of potatoes are usually put through the machine again and cut into square sticks for French fried potatoes; and for many other purposes which are common and well-known.

The objects of the invention are to provide an improved machine for making a plurality of slices at the same time; to draw the material being sliced onto the blades by their rotation; to force said material entirely between said blades, by their rotation, and thus positively and completely cut the same; to provide a stationary cutting block and rotating blades; to provide means for adjusting said block toward and away from the blades; to hinge the hopper so as to readily expose the blades; to secure simplicity of construction and operation, and to obtain other advantages and results as may be brought out in the following description.

Referring to the accompanying drawings, in which like numerals of reference indicate the same parts throughout the several views, Figure 1 is a side elevation of a preferred form of machine embodying my invention;

Fig. 2 is an elevation from the right hand end of Fig. 1;

Fig. 3 is a vertical sectional view on line A—A of Fig. 2, looking in the direction indicated by the arrows;

Fig. 4 is a sectional view, similar to Fig. 3, of a slightly modified construction;

Fig. 5 is a transverse sectional view on line B—B of Fig. 4;

Fig. 6 is a transverse sectional view on line C—C of Fig. 4, and

Fig. 7 is a detail perspective view of a certain cutting block.

In the specific embodiment of the invention illustrated more especially in Figs. 1, 2 and 3 of said drawings, the reference numeral 1 indicates a hollow base surmounted by a hopper 2 preferably hinged to the base and providing therewith an interior chamber 3 into the upper end of which is adapted to be inserted the material to be sliced and from the bottom of which said material is adapted to emerge after having been sliced. Extending transversely through said chamber from side to side of the machine is a shaft 4 journaled in bearings 5, 5 on the base, and clamped on said shaft within said chamber 3 is a plurality of parallel disks 6 which are peripherally sharp-edged and constitute the cutting blades, washers 7 preferably being inserted between the blades so as to separate them to obtain the desired thickness of slice. It is to be understood that said washers 7 are of a smaller diameter than the diameter of the blades so as to leave the peripheral margin of the blades free for slicing, and furthermore I do not restrict myself to any thickness of washer as it will be obvious that the thickness of washers used determines the thickness of slices obtained.

As viewed in Figs. 1 and 3, I preferably rotate the shaft 4 in a clockwise direction, so that the upper portion of the blades move from the front toward the back of the machine. As shown especially in Fig. 3, the front wall 8 of the hopper slopes rearwardly downward into close proximity at its lower inner edge to the edges of the blades 6, and it is preferable that said sloping front wall terminate substantially at the top of the blades where the edges of the blades are moving substantially horizontally. In this manner, as the material to be sliced leaves the sloping wall and engages the blades, the motion of the blades will carry said material away from the front wall toward the back wall 9 of the hopper, and will not have to raise the material against gravity, since said blades are moving substantially horizontally where the material slides onto them, and thus I enable a rapid feed of material onto the blades.

The back wall 9 of the hopper at its upper portion 10 forms a downwardly converging chute with the front wall, but at a distance from the front wall and from the blades and preferably at a point substantially over the center of the blades, the back wall of the hopper is deflected backward and curves downwardly, as at 11, toward the blades into substantially vertical tangency therewith, thus gradually reducing the space between the blades and the back wall whereby the material being sliced will be forced or crowded radially onto the blades as the blades carry said material around, and where the wall and blades are substantially tangent it will be evident that said material will have been cut into slices and forced between the blades.

In order to obtain a complete and positive cut entirely through the material, I provide a cutting block 12, see Figs. 3 and 7, extending from side to side of the chamber 3 preferably below the horizontal diametric plane through the blades, and forming the lower end of the curved or wedge portion 11 of the back wall of the hopper. This block 12 is provided with a longitudinal rib 13 preferably along its upper front edge, said rib having a series of vertical slots 14 to receive the edges of the blades 6. The protuberances 15 or portions of the rib between the slots 14 project slightly inward between the blades, and are preferably tapered forwardly downward at their tops, as at 16, so that as the slices of material being cut engage said protuberances, said material is forced inwardly of the blades and each slice positively cut from the adjoining slices. The cutting block 12 is supported at both ends upon suitable lugs 17, 17 on the interior of the side walls of the base 1, and an overlying portion 18 on the back wall of the base 1 retains the block upon these lugs. Adjusting bolts 19, 19 through the back wall of the base permit adjusting the block 12 toward the blades, and a clamping bolt 20 through one side wall of the base engages the end of the block and clamps the same against the opposite side wall of the base in adjusted position.

For insuring removal of the slices from between the blades, I provide a comb 21 here shown as positioned at the front end of the chamber 3 below the center of the blades, sloping rearwardly upward therebetween from the front wall of the base. Suitable lugs 22 on the inside of the side walls of the base support the comb, and a bracket 23 at the front end of the comb extends upward and is engaged by lugs 24 on the side wall of the hopper when said hopper is closed down upon the base, to prevent the comb from rising or being displaced upward, and yet leaving it free to be removed when the hopper is raised.

It will be noted that this hinging of the hopper as shown in Figs. 1 to 3 is at the front end of the device, a pivot rod 25 extending through ears 26 and 27 on the base and hopper, respectively, providing the hinge. At the opposite or rear end of the device I provide catch members 28, 29 for holding the hopper closed upon the base.

Where it is desired to hinge the hopper and base together at the back of the machine, as shown in Fig. 4, it is necessary to modify the mechanical structure sufficiently to avoid striking the blades with the lower edge of the back wall of the hopper, and I have shown such modification in Figs. 4–6, inclusive. Referring to these figures, the reference numeral 30 indicates the hollow base to the rear end of which is hinged, as at 31, a hopper 32 forming with the base an interior chamber 33 within which is mounted a series of revolving blades 34. At the back of the machine the back wall 35 of the base extends a distance above the horizontal plane through the axis of the blades so that the hinge 31 is also above said plane. A cutting block is supported on lugs 36 and adapted to be adjusted toward and away from the blades by screws 37 as described in connection with the preferred embodiment of Figs. 1 to 3. A bolt 38 also clamps the cutting block endwise against one side wall of the base, and an overlying portion 39 shown as bolted to the back wall of the base and extending from side to side of the chamber 33 is high enough to fill in from the top of the cutting block to the top of the back wall of the base. The front face of the overlying portion 39 forms a continuation of the curved back wall 40 of the hopper, and is substantially tangent to the blades. Catch members 41, 42 for holding the hopper closed down upon the base are provided upon the opposite or front end of the machine.

Obviously in operation the material to be sliced, such for instance as a side of bacon, is introduced into the hopper, and travels down the sloping front wall to the knives. The knives, which are continuously rotating, draw the material toward the back wall of the hopper, and the material wedges between the back wall and knives, which thereupon slice into the material more and more until it is finally completely severed by the passage of the blades between the protuberances of the cutting block. The comb removes such slices as stick between the blades, and the sliced material drops down through the hollow base to any suitable receptacle. As a particular use of my machine, it may be noted that potatoes may be sliced therein and the slices reinserted in the hopper, to be recut; the slices will slide down the inclined front wall of the hopper and the blades will consequently cut the slices into strips such as are used for cooking the commercial French fried potatoes.

Obviously detail modifications may be made in manufacturing my improved machine for slicing meat, vegetables, etc., without departing from the spirit and scope of the invention, and I do not wish to be understood as limiting myself except as required by the following claims when constructed in the light of the prior art.

Having thus described my invention, what I claim is—

1. In a machine of the character described, the combination with a base, a shaft with cutters thereon mounted transversely of the said base, a cutting block and a comb on opposite sides of the cutter shaft and supported upon the interior of the base, of a hopper hinged to the top of the base so as to hold both the block and comb in position when closed, and means for locking said hopper.

2. In a machine of the character described, the combination with a base, a plurality of revolving blades mounted therein, and a comb supported in said base with teeth projecting between the blades, of a hopper hinged to the top of the base, and means adapted to engage both the comb and hopper when closed and hold the comb in operative position.

3. In a machine of the character described, the combination with a base, a plurality of revolving blades mounted therein, and a comb in said base having teeth projecting between said blades, of a hopper hinged to the top of said base, and a bracket adapted to extend between said comb and hopper when closed and hold the comb in position.

4. In a machine of the character described, the combination with a base, a plurality of revolving blades mounted therein, a comb having its teeth projecting between said blades, said base having lugs for supporting said comb, and said comb having a bracket at its end away from the blades, and a hopper hinged to said base adapted when closed to engage said bracket and prevent displacement of said comb.

5. In a machine of the character described, the combination with a base, a plurality of revolving blades mounted therein, a comb having its teeth projecting between said blades, said base having lugs for supporting said comb and said comb having a bracket at its end away from the blades, and a hopper hinged to said base having lugs adapted to engage said bracket when the hopper is closed and prevent displacement of said comb.

6. In a machine of the character described, the combination with a base, a plurality of revolving blades mounted therein, a comb having its teeth projecting between said blades, said base having lugs for supporting said comb and said comb having a bracket at its end away from the blades adapted to engage the end wall of said base, and a hopper hinged to said base adapted when closed to engage said bracket and prevent displacement of said comb.

7. In a machine of the character described, the combination with a base, a plurality of revolving blades mounted therein, a comb having its teeth projecting between said blades, said base having lugs for supporting said comb and said comb having a bracket at its end away from the blades adapted to engage the end wall of said base, and a hopper hinged to said base having lugs adapted to engage said bracket when the hopper is closed and prevent displacement of said comb.

HENRY C. SANDER.

Witnesses:
HOWARD P. KING,
JANET A. AYERS.

Copies of this patent may be obtained for five cents each, by addressing the "Commissioner of Patents, Washington, D. C."